(12) United States Patent
Berghoff et al.

(10) Patent No.: US 6,640,576 B2
(45) Date of Patent: Nov. 4, 2003

(54) FOODSTUFF CHILLING DEVICE

(75) Inventors: Rudolf Erwin Berghoff, Meschede-Berge (DE); Ulf Christian Pöpleu, Seevetal (DE)

(73) Assignee: AGA Aktiebolag (SE)

( * ) Notice: Subject to any disclaimer, the term of this patent is extended or adjusted under 35 U.S.C. 154(b) by 0 days.

(21) Appl. No.: 09/787,477

(22) Filed: Mar. 16, 2001

(65) Prior Publication Data

US 2002/0152764 A1 Oct. 24, 2002

(30) Foreign Application Priority Data

Mar. 16, 2000 (EP) ............................................. 00105569

(51) Int. Cl.[7] ........................ F25D 25/04; F25D 17/02; F25D 13/04; F25D 13/06
(52) U.S. Cl. ................. 62/380; 62/374; 62/63; 62/65
(58) Field of Search .................... 62/380, 374, 63, 62/62, 65

(56) References Cited

U.S. PATENT DOCUMENTS

| 1,998,431 | A | * | 4/1935 | Birdseye ...................... 62/60 |
|---|---|---|---|---|
| 2,254,420 | A | | 9/1941 | Cleveland ................... 62/102 |
| 2,582,789 | A | | 1/1952 | Morrison ..................... 62/104 |
| 3,698,201 | A | * | 10/1972 | Hirahara ....................... 62/62 |
| 3,718,007 | A | * | 2/1973 | Randrup ....................... 62/63 |
| 3,952,540 | A | | 4/1976 | Okada et al. ................. 62/374 |
| 4,012,185 | A | * | 3/1977 | Poore et al. ................. 425/120 |
| 4,154,333 | A | * | 5/1979 | Lapeyre ...................... 198/707 |
| 4,454,942 | A | * | 6/1984 | Oizumi .................... 198/418.6 |
| 4,548,573 | A | * | 10/1985 | Waldstrom .................. 425/442 |
| 6,009,719 | A | | 1/2000 | Ochs ........................... 62/380 |

* cited by examiner

Primary Examiner—William C. Doerrler
(74) Attorney, Agent, or Firm—Medlen & Carroll, LLP.

(57) ABSTRACT

The present invention provides food coolers the cooling, in particular deep freezing, of foods produced as moldings (3) comprising a refrigerating space (1) and a conveyor belt (2) for conveying the foods (3) through this refrigerating space (1). The conveyor belt (2) is assigned holding devices (6) for the defined positioning of the moldings (3) on the conveyor belt (2).

33 Claims, 3 Drawing Sheets

FOODSTUFF CHILLING DEVICE

The present application claims priority to European Patent Application EP 00 105 569.8, filed Mar. 16, 2000.

FIELD OF THE INVENTION

The invention relates to a food cooler for the cooling, in particular deep freezing, of essentially flat and/or barlike foods produced as moldings, with a refrigerating space and with a conveyor belt for conveying the foods through this refrigerating space, the conveyor belt being assigned holding devices for the moldings.

BACKGROUND OF THE INVENTION

Food coolers of the type initially mentioned are known from prior public use, in which foods to be deep-frozen are laid onto a conveyor belt and are conveyed through the refrigerating space.

U.S. Pat. No. 2,254,420 discloses a food freezer with baskets arranged on a conveyor belt for the deep freezing of whole poultry bodies. The length of the baskets corresponds approximately to the greatest extent of the poultry bodies. U.S. Pat. No. 3,952,540 discloses a cooling appliance for the deep freezing of foods by means of refrigerating gas, in which holding devices for the foods are provided in the form of plate elements arranged approximately perpendicularly to the conveyor belt. The food reception spaces thereby obtained are delimited upwardly by a housing. The height of the holding plates corresponds approximately to the distance between them.

SUMMARY OF THE INVENTION

The object of the invention is to provide a food cooler of the type initially mentioned, in which the cooling operation proceeds more quickly and/or more efficiently.

The invention achieves this object in that the holding devices are designed for the defined holding of the moldings on the conveyor belt in a position inclined at at least 45° to upright.

The present invention provides food coolers for the cooling, in particular deep freezing, of essentially flat and/or barlike foods produced as moldings (3), with a refrigerating space (1) and with a conveyor belt (2) for conveying the foods through this refrigerating space (1), the conveyor belt (2) being assigned holding devices (6) for the moldings (3), wherein the holding devices (6) are designed for the defined holding of the moldings (3) on the conveyor belt (2) in a position inclined at at least 45° to upright. In some embodiments, the holding devices (6) are arranged with a spacing from one another which is smaller than the average extent of a molding (3) to be frozen. In alternative embodiments, the holding devices (6) are arranged with a spacing from one another which corresponds to the thickness of a molding (3) to be frozen, plus a clearance of at most 5 cm, preferably at most 3 cm, preferably at most 0.5 cm. In still further embodiments, the holding devices (6) are suitable for supporting the moldings (3) in a region which is at a distance from the lowest point of the moldings which corresponds to 50 to 100%, preferably 60 to 75%, of the molding width or molding height. In some preferred embodiments, the holding devices (6) comprise at least one holding rod (8) which extends approximately parallel to the conveyor belt. In additional embodiments, the holding devices (6) are gridlike. In some particularly preferred embodiments, the holding devices (6, 12) have compartments for receiving food bodies. In further embodiments, a precooling stage (13) for precooling or prefreezing food bodies (3) is provided.

DESCRIPTION OF THE FIGURES

The invention is explained below by means of advantageous exemplary embodiments with reference to the following Figures.

DEFINITIONS

Figure 1:
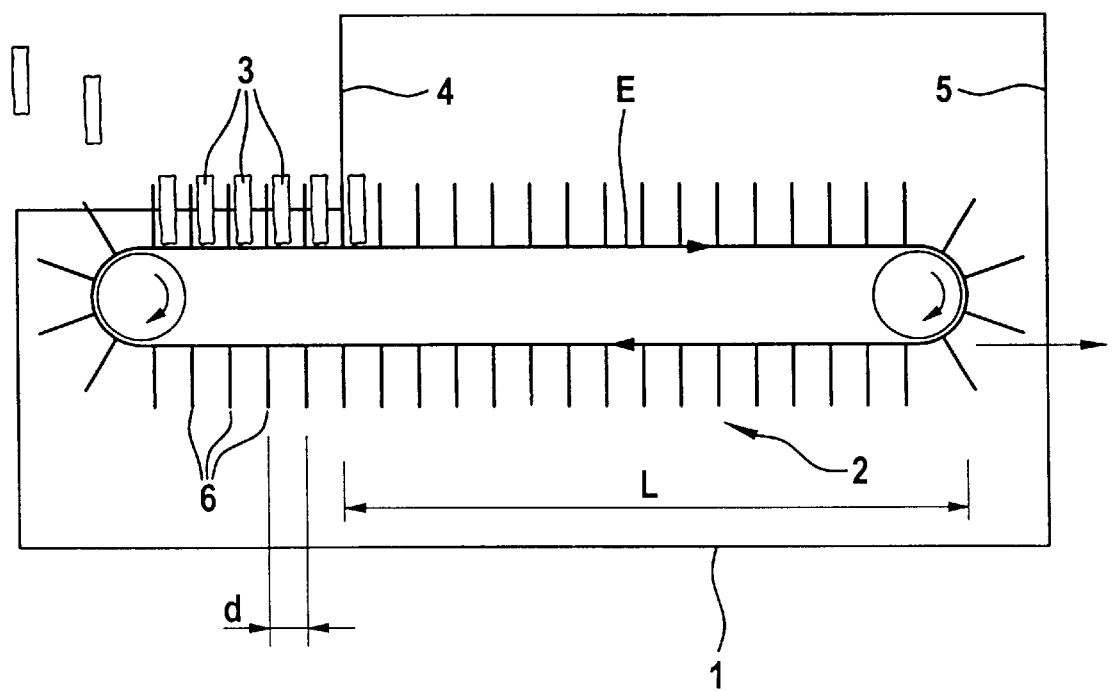
FIG. 1 shows a diagrammatic side view of a food cooler.

Some of the terms used within the scope of the invention will be explained first.

The term "cooling" may, on the one hand, mean cooling to temperatures of above freezing point, for example the cooling of heat-treated products from, for example, +70° C. to +10° C. Cooling also includes, in particular, deep freezing. Deep freezing (freezing) means that the foods are exposed for a sufficient period of time to a refrigerating medium of sufficiently low temperature, so that, after the freezing operation, a core temperature markedly below the freezing point of water prevails, as a rule below −18° C. The cooler is then designated as a freezer.

The refrigerating medium may be, for example, low-temperature gas or air which is cooled with the aid of compression refrigerating machines. In this case, heat exchange may be increased, if appropriate, by a convection flow being maintained in the refrigerating space with the aid of fans and cooling efficiency may be improved. The refrigerating medium may also be a low-temperature gas, condensed if appropriate, which is sprayed directly onto the food bodies.

"Moldings" within the meaning of the invention are all foods either which have from the outset a predetermined external shape recurring within the framework of the dispersions customary in foods or else which have been brought to a desired shape by means of a splitting or forming operation. Examples which may be mentioned are slivers or other preferably flat pieces of meat, fish fillets, fish fingers and the like.

In moldings formed essentially flat or else barlike, the smallest dimension (thickness) is markedly smaller than at least one of the other two dimensions in the other spatial directions (length or width). In an "essentially flat" food, the length of a so-called long side is greater by a multiple than the thickness, as a rule at least four times, six times or eight times the latter. In this context, "essentially" means that there may be deviations from the flat shape at individual points, without a generally flat character being lost thereby. The width of the flat foods is between the length and the thickness. In the case of a width corresponding approximately to the thickness, the food is essentially barlike. The discussion of flat foods also includes hereafter the barlike foods. The direction of the longest extent of the molding is designated hereafter as the "length." The "width" is that direction perpendicular to the longitudinal direction which has the greatest extent. The "thickness" designates the direction perpendicular to the longitudinal direction and to the width.

Foods can be produced as sufficiently dimensionally stable moldings even at temperatures above a specific temperature, for example freezing point. They may consist, for example, of a homogeneous, sufficiently firm mass, for example a firm piece of meat. There may also be formed by a heterogeneous mixture of smaller ingredients, for example a vegetable mixture which is held together with the aid of a binding substance. It is therefore not the composition of a molding which is important, but solely the property of sufficient dimensional stability in a spatial arrangement of the molding under the effect of gravity. Also included are foods which, at temperatures, for example, above freezing point, consist of loose ingredients or, for example because of their water content, are not sufficiently dimensionally stable (soft pieces of meat), but, at temperatures below freezing point, are held together or stabilized by frozen liquid. In this case, when they enter the refrigerating space, the food bodies are already precooled to a suitable temperature, at least in the near-surface region. Cheese products are dimensionally stable, for example, at temperatures of below +40° C. They are therefore to be precooled correspondingly after the production process during which they reach temperatures of above +40° C. Finally, those foods are included which are not themselves dimensionally stable, but in which dimensional stability is achieved by means of packaging.

"Defined holding" within the meaning of the invention means that the moldings assume a spatial position on the conveyor belt which is predetermined by the holding devices. Within the scope of the invention, this may be any spatial position which deviates from the arbitrary position which a molding would assume on a flat conveyor belt without holding devices. In particular, there is provision, by the defined positioning provided according to the invention, for a larger part of the surface of the molding to be freely accessible to the refrigerating medium than if the molding were to rest, undefined, on the conveyor belt. Accordingly, as regards the flat or barlike moldings affected, the holding devices ensure that the moldings stand essentially with a narrow side on the belt, so that the largest part of their surface is freely accessible to the refrigerating medium. The holding of the flat moldings "in an inclined to upright position" refers to the angle which the area spanned in terms of length and width forms with the plane of the conveyor belt. Where barlike foods are concerned, this is the angle between the bar axis and the plane of the conveyor belt. This angle is at least 45°, preferably at least 60°, further preferably at least 75° to 90°. The underside is then formed by one of the narrow sides, in which case the longitudinal narrow side is often to be preferred for reasons of stability.

When the moldings are sprayed with condensed low-temperature gas or when a gaseous refrigerating medium is swept around them, the efficiency of cold transmission and therefore also the cooling rate depend directly on the freely sprayable or sweepable area. According to the invention, that fraction of the area of a molding which is not directly accessible to the refrigerating medium is preferably markedly reduced.

The term "conveyor belt" has a generalized meaning within the scope of the present invention. It designates an endlessly revolving conveying means for the conveyance of the food moldings over a predetermined conveying distance. It may consist of a unitary belt or of a plurality of members. The conveyor belt is not restricted to closed or sheetlike belts. Partially open versions, for example, chain conveyors known from the prior art, are advantageous, since they improve the accessibility of the underside of the food bodies lying on the belt to the cooling medium. Furthermore, the conveyor belt is not restricted to a belt which is flat in relation to the width. The extent of the conveyor belt perpendicularly to the conveying direction and to the lateral extent is, under some circumstances, no smaller than the width of the belt itself. As regards the dimensions of the conveyor belt, it is certain only that the belt length should be large in relation to the width and to the extent perpendicular to the latter. The conveyor belt is also not restricted to specific materials. It may, for example, consist of a plastic belt, but also be composed of metallic chain links. The length of the conveying distance predetermined by the conveyor belt is also independent of the extent of the refrigerating space. For example, the conveyor belt may be continued at one end or at both ends beyond the refrigerating space; it may also be that the conveyor belt does not extend at one end or at both ends as far as the edge of the refrigerating space. Moreover, the orientation of the conveyor belt is not fixed. While the conveyor belt will in many cases run horizontally, it may, under some circumstances, also be inclined, in so far as it can perform only its conveying function.

The refrigerating space is not restricted in terms of either its form or its nature, but is defined solely by its function of making available a refrigerating medium of sufficiently low temperature in a spatially delimited region and/or over a particular period of time. In the case of direct spraying with condensed gas, this is the space filled by the gas to be sprayed on. It is not even necessary, in this case, for the refrigerating space to be delimited materially by walls or in another way. It is also not necessary that the refrigerating medium be constantly available in the refrigerating space over a relatively long period of time; particularly when low-temperature gas is sprayed on directly, this may also take place in a pulsed manner. However, a space delimited by walls may be advantageous, in order to improve the refrigerating action of the refrigerating medium, fans also being used to maintain forced convection. In this case, expediently, inlet and outlet orifices (if appropriate, with cold locks) for conveying the food bodies respectively into and out of the cooler are provided in the cooler walls.

Nor are the holding devices restricted in terms of either the material or their form, but are likewise defined solely by their holding function. They may therefore be concrete devices, for example superstructures mounted on the conveyor belt or guides arranged above the latter. They may, however, also be, for example, depressions of any desired type in the conveyor belt. The holding devices may be separate parts or parts arranged on or above the conveyor belt and, if appropriate, fastened to the latter or be produced in one piece as part of the conveyor belt itself. They are suitably constituted and arranged in order to hold a food body to be cooled in a defined position on the conveyor belt. This is intended to refer to any position which deviates from the position which a food body to be cooled would normally assume on the conveyor belt if the holding devices were not present. In this context "normally" means that arrangements which are possible in principle, but are unlikely, can be ignored. The normally assumed position corresponds, as a rule, to that in which the food body has the lowest center of gravity. The feature of "defined positioning" therefore does not mean that the orientation of the moldings in relation to the conveyor belt is fixed, but the position is defined merely as deviating from the imaginary position which would normally be assumed without holding devices. If the holding devices are arranged above the plane of the conveyor belt, the position of a held molding is defined by a raised center of gravity, as compared with that of a molding lying on the conveyor belt without holding devices.

The invention recognized that flat moldings are positioned as "flat" as possible on a conveyor belt without holding devices under the effect of gravity, that is to say extend lengthways approximately parallel to the plane of the conveyor belt. As a result of the mass distribution of the molding being as "flat" as possible in the position without holding devices, the molding underside facing the conveyor belt forms a particularly large area. This is a disadvantage, since the molding surface facing the conveyor belt is less accessible or not accessible at all to the coolant, also because of the comparatively large amount of space required by the molding on the conveyor belt. By contrast, with the aid of the holding devices according to the invention, the moldings are held in an essentially inclined to upright position deviating from this unfavorable position. This leads to a reduction in a molding area facing the conveyor belt and therefore to an increase in the active area for the refrigerating medium and to a corresponding saving of space. As regards the flat foods affected, a saving of space and therefore an increase in efficiency are possible up to a factor which is determined by the ratio of width (or length) to thickness. The saving of space is limited, in practice, by the thickness of the holding devices and by some clearance between the holding devices and moldings.

The enlarged surface accessible to the refrigerating medium leads directly to an increase in efficiency in the case of the same overall length, since the necessary dwell time of the moldings in the refrigerating space is reduced. The conveying speed can be increased accordingly, thus leading directly to an increase in the throughput rate. Alternatively, the conveying speed can be kept constant and the overall length shortened correspondingly. It is also possible both to increase the throughput rate by a smaller amount and at the same time reduce the overall length by a corresponding amount. Finally, it may also be desirable to keep the overall length, the conveying speed and consequently the dwell time of the moldings in the cooling space constant. The improved cooling efficiency can then be used, for example, for lowering the temperature of the refrigerating medium, specifically until the cooling result corresponds to that of a conventional cooler without holding devices. This entails a saving of energy and therefore of cost.

The reduction in the area occupied by the moldings in the plane of the conveyor belt may be used, in particular, to arrange the moldings on the conveyor belt more densely. This results, in the case of a constant conveying speed, in an increase in the throughput rate. Similarly, instead of this or in combination with it, a shortened overall length or a reduced energy requirement of the cooler or freezer can be achieved.

Preferably, the conveyance of the moldings takes place with a long side oriented either transversely or parallel to the conveying direction. In the case of conveyance with a long side transverse to the conveying direction, the supporting parts of the holding devices are arranged essentially transversely to the conveying direction and are expediently fastened to the conveyor belt. Depending on the dimensions of the conveyor belt and moldings, a plurality of these can be conveyed next to one another.

In the case of conveyance with a long side parallel to the conveying direction, the holding devices or their supporting parts are arranged essentially likewise parallel to the conveying direction. They may, in this case, be fastened to the conveyor belt and be conveyed concomitantly. Advantageously, however, these are in this case fixed holding devices which are arranged above the conveyor belt and which extend over the entire conveying distance. The advantage of this arrangement is that fastening of the holding devices to the conveyor belt can be dispensed with. The conveying force is in this case generated by the friction between the moldings and the conveyor belt. Advantageously, a plurality of holding devices of this type are arranged parallel to one another, in order to increase the conveying capacity correspondingly. For example, by means of appropriate grids, a plurality of guide ducts can be formed, which are arranged above the conveyor belt and parallel to the conveying direction and through which a plurality of rows of moldings are conveyed next to one another on edge (with a narrow side lying on the conveyor belt).

In order to utilize the reduced area of the moldings and bring about a saving of space, the holding devices are arranged with a mutual spacing which is smaller than the average extent of a molding. The mutual spacing corresponds advantageously to the thickness of the moldings plus a clearance which may amount to 5 cm, but will often be smaller than 3 cm or 5 mm. By the holding devices being arranged closely to one another, there is an improvement in the saving of space. This concerns holding devices arranged both transversely and parallel to the conveying direction.

The holding devices are preferably designed to be as open as possible, that is to say essentially permeable to the refrigerating medium. The more open the holding devices are in this case, as compared with the conveyor belt, the greater is the increase in cooling efficiency brought about by the increased surface accessible to the refrigerating medium. For example, gridlike holding devices which are arranged transversely or parallel to the conveying direction may be envisaged. The moldings are positioned by lying at least partially against the grid or, in the case of an inclined orientation, on the latter. The permeability of the grid may be improved by the grid meshes being enlarged, specifically up to a mesh size in the region of the length or width of the molding. The holding devices are assigned to the conveyor belt. This means that they have a defined spatial arrangement in relation to the conveyor belt. Within the scope of the invention, the holding devices may be fastened to the conveyor belt and run concomitantly with the latter, alternatively they may be arranged fixedly, for example above the conveyor belt, and guide ducts may be formed, which extend in the conveying direction of the belt and through which the moldings run.

A holding device may also consist of an expediently arranged plurality of holding rods, the transitions to the grid form being smooth. Under some circumstances, a single approximately horizontal holding rod transverse or parallel to the conveying direction may be sufficient for performing the positioning function. The terms "horizontal" and "vertical" relate here and hereafter to the plane of the conveyor belt. Expediently, this holding rod is suitable for supporting the moldings in a region which is at a distance from the lowest point of the held molding which corresponds to 50 to 100%, preferably 60 to 75%, of the molding width (or of the molding height if the underside of the positioned moldings is the short narrow side). On the one hand, for reasons of stability, the distance should not be too low, in particular the upper supporting point should not lie below the center of gravity. On the other hand, there should be a sufficient safety distance from the top edge of the positioned moldings. In the lower region, the moldings can be additionally supported with the aid of holding devices, for example an approximately horizontal holding rod. Further approximately horizontal holding rods may be provided in between, for example, in order to prevent sagging or slipping in the case of a food body which is not entirely dimensionally stable. The horizontal holding rods are expediently held by vertical rods which, if appropriate, may be fastened to the conveyor belt.

In the case of holding devices arranged essentially transversely to the conveying direction, lateral holding parts may be provided, which prevent the moldings from drifting out laterally. These parts may likewise be gridlike or rodlike. The lateral holding parts may be expedient particularly in the case of round moldings, for example potato waffles. In this form, the holding devices provide compartments for receiving the food bodies.

As already mentioned, the term "molding" also includes those foods which do not have the presupposed dimensional stability at temperatures above a specific temperature (for example, freezing point), either because they are too soft or because they consist of individual ingredients held together only loosely. In this case, it is expedient to provide at the inlet end of the refrigerating space, a precooling stage in which the foods are precooled appropriately in order to generate the desired dimensional stability, for example to a temperature just below the dimensional stability temperature. In this case, partial cooling or freezing of the foods, for example in their near-surface region, may even be sufficient. The precooling stage is not restricted to an arrangement directly adjacent to the cooling space. For example, a further conveying distance may be arranged between the two cooling spaces. It is essential merely that the precooling precedes in time the cooling in the refrigerating space and that the food bodies, when they enter the refrigerating space, have sufficient dimensional stability.

DESCRIPTION OF THE INVENTION

A food cooler comprises a refrigerating space (1), in which is arranged a conveyor belt 2 for conveying food moldings (3) through the refrigerating space. Inside the refrigerating space (1) are provided cold generation devices, not shown, which generate, within the refrigerating space (1) or at least in the region through which the food bodies (3) run, a refrigerating medium, in the simplest case air, with a temperature sufficiently low for the deep freezing of the food bodies. The food bodies (3) enter on the inlet side (4) of the refrigerating space at an initial temperature, for example, in the range of +5° C. to +20° C., the inlet temperature also being capable of being substantially higher (up to 80° C.) than or just below freezing point (down to −4° C.). The cooling capacity, the length of the conveying distance in the refrigerating space (L) and the conveying speed of the conveyor belt (2) are dimensioned such that the food bodies (3) leave the refrigerating space (1) on the outlet side (5) in the cooled, for example deep-frozen state, that is to say with a core temperature of, for example, −18° C. or below. The conveyor belt (2) is designed as a chain conveyor which is partially permeable to the refrigerating medium. In the case of cryogenic freezing by a low-temperature condensed gas being sprayed on directly, spray nozzles are arranged above the plane (E) of the conveyor belt and preferably also below this. Both as regards cold generation by means of compression refrigerating machines and as regards cryogenic freezing, fans, not shown, for maintaining convection within the refrigerating space (1) may advantageously be provided, which accelerate the heat exchange and increase the freezing efficiency.

The food bodies (3) are flat moldings, for example pork cutlets, which have sufficient dimensional stability even before they enter the refrigerating space (1). In the example mentioned, they have dimensions of approximately 120 mm×80 mm×15 mm.

Holding grids (6) are fastened with regular spacing to the conveyor belt (2). As is evident from FIG. 1, they hold the moldings (3) in an essentially vertical position, in which their underside is formed by the longer narrow side (120 mm×15 mm). The moldings (3) are oriented transversely to the conveying direction and extend vertically by their width of 80 mm above the plane (E) of the conveyor belt. The positioning of the moldings (3) which is achieved with the aid of the holding grids (6) deviates from the position which the moldings would assume without the holding devices (6), to be precise a position lying flat, in which the moldings (3) would extend above the plane E of the conveyor belt merely by their thickness of 15 mm. In the case of an arrangement transverse to the conveying direction, each molding would extend 80 mm in the conveying direction, which is more than five times as much as the corresponding extent of the moldings (3) in the upright position.

The holding grids (6) are arranged along the conveyor belt (2) with a mutual spacing d of 25 mm. This corresponds to the thickness of the flat moldings 3 of 15 mm plus a clearance of 10 mm. The spacing (d) is therefore substantially smaller than the average extent of 65 mm of the moldings (3) (the average extent is determined by the diameter of a sphere of the same volume). The spacing (d) is to be compared with the abovementioned extent of the moldings (3) in the conveying direction without the holding grids (6) (80 mm), plus a mutual spacing of approximately 20 mm. Over the same conveying distance, therefore, with the aid of the holding grids (6), more than four times as many moldings (3) can be positioned transversely to the conveying direction as in the case of a corresponding arrangement without holding grids (6). Consequently, with the conveying distance length (L) being the same and the conveying speed being unchanged, the throughput rate of the moldings (3) through the freezer increases by the same factor. Alternatively, the increase in capacity may be used for reducing the conveying length (L) and/or for reducing the energy consumption, as explained above.

Figure 2:
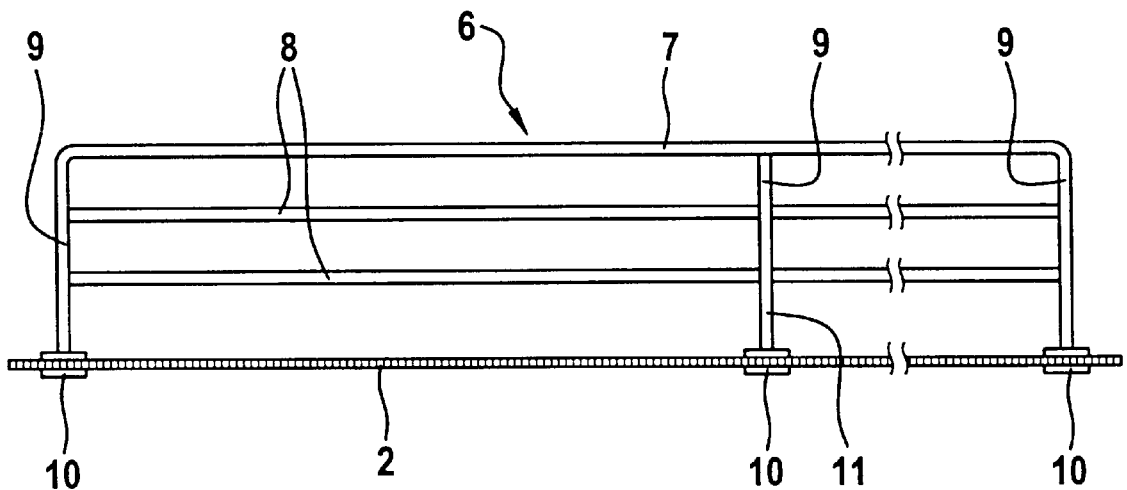
FIG. 2 shows a view of a holding device fastened to the conveyor belt, from the conveying direction.

As is evident from FIG. 2, the holding devices (6) are gridlike, the size of the grid meshes both in the vertical and in the horizontal direction, corresponding to 0.2 to 0.5 times, preferably to 0.3 to 0.4 times, the width or length of the moldings (3). The holding grid (6) is formed by a plurality of interconnected rods consisting, for example, of high-grade steel. A holding device (6) comprises a holding rod (7) which extends horizontally transversely to the conveying direction. As is evident from FIG. 3, these holding rods (7) are suitable for supporting the moldings (3) at a point which is at a distance s from the lowest point a of the moldings which corresponds to approximately 70% of the molding width. The molding (3) is thereby supported reliably in the upper region. Support at the lower end may take place, for example, by frictional connection with the conveyor belt (2) or by support on one of the rods of the adjacent holding grid 6. Below the supporting rod (7), further horizontal rods (8) may be provided, which serve for increasing the stability and/or, where not entirely dimensionally stable food bodies are concerned, prevent sagging or slipping underneath the supporting rod (7). The horizontal supporting rods (7), (8) are fastened to two or more vertical holding rods (9) which, in turn, are fastened to the conveyor belt (2) at (10). The rods (7), (8), (9) forming the holding grid (6) have a thickness which is small in comparison with the molding thickness. In the present example, it may be in the range of 3 to 4 mm. The vertical holding rods (9), in particular a rod (11) arranged between the outer rods, may also contribute, in particular, to supporting the moldings (3) in the lower region.

Figure 3:
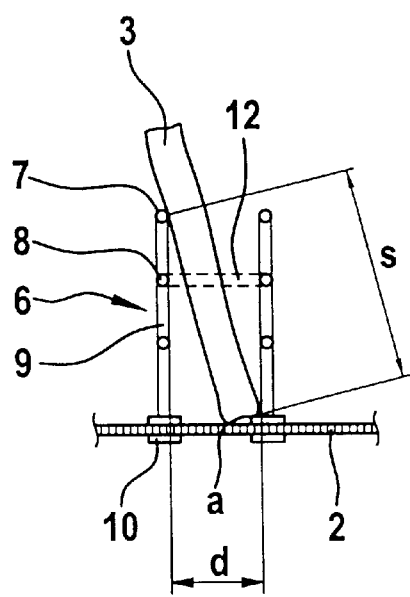
FIG. 3 shows a side view of a holding device fastened to the conveyor belt.

As indicated in FIG. 3 with the aid of broken lines, lateral strutting (12) of the holding grids (6) may be provided, in order to prevent the moldings (3) from slipping or drifting out. By virtue of the lateral holding rods or holding grids (12), the holding devices (6, 12) acquire, in general, the form of compartments for receiving the moldings (3).

Figure 4:
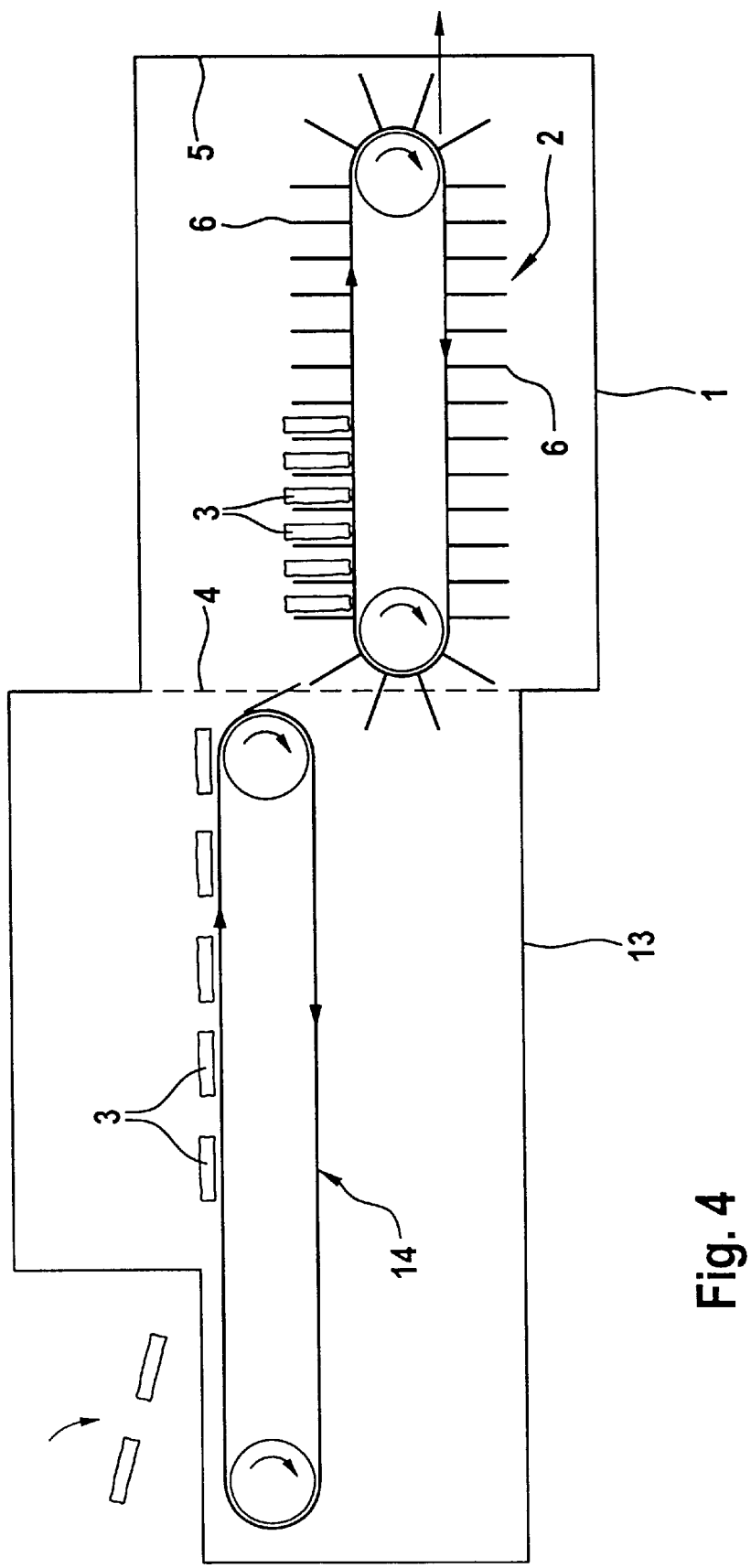
FIG. 4 shows a food cooler with a precooling stage.

If the food bodies (3) are not readily dimensionally stable by nature or as a result of the production process, a precooling stage (13) for precooling or prefreezing the food body (3) is expediently arranged at the inlet end (4) of the refrigerating space (1). This may be a further refrigerating space (13) and a conveyor belt (14) which is arranged therein and on which the food bodies (3), lying flat, are guided through the refrigerating space (13), sufficient dimensional stability being achieved, at least in the outer region, as a result of the precooling of the moldings (3). When they enter the refrigerating space (1), the moldings are introduced into the interspaces formed by the holding grids (6) and preserve their form in the upright position when being conveyed through the refrigerating space (1). In the example of FIG. 4, because the food bodies (3) are arranged so as to lie flat, the conveying speed of the conveyor belt (14) in the cooling space (13) is substantially higher than the conveying speed of the conveyor belt (2).

What is claimed is:

1. A food cooler for the cooling of food bodies selected from the group consisting of essentially flat foods and barlike foods, produced as at least one molding, comprising: a refrigerating space comprising a refrigerating medium, at least one conveyor belt for conveying at least one molding through said refrigerating space; wherein said conveyor belt is assigned one or more holding devices for said at least one molding, and wherein said holding device is designed for the defined holding of said at least one molding on said at least one conveyor belt in an inclined to upright position of at least 45°, with said at least one molding directly accessible to said refrigerating medium when conveyed through said refrigerating space.

2. The food cooler of claim 1, wherein said incline to upright position of said at least one molding is at least 60°.

3. The food cooler of claim 2, wherein said incline to upright position of said at least one molding is at least 75° to 90°.

4. The food cooler of claim 1, wherein said holding devices are arranged with a spacing from one another which is smaller than the average extent of said at least one molding to be frozen.

5. The food cooler of claim 1, wherein said holding devices are arranged with a spacing from one another which corresponds to the thickness of said at least one molding to be frozen, plus a clearance of at most 5 cm.

6. The food cooler of claim 5, wherein said holding devices are arranged with a spacing from one another which corresponds to the thickness of said at least one molding to be frozen, plus a clearance of at most 3 cm.

7. The food cooler of claim 5, wherein said holding devices are arranged with a spacing from one another which corresponds to the thickness of said at least one molding to be frozen, plus a clearance of at most 0.5 cm.

8. The food cooler of claim 1, wherein said holding devices are suitable for supporting said at least one molding in a region which is at a distance from the lowest point of said at least one molding which corresponds to 50 to 100% of said at least one molding width or said at least one molding height.

9. The food cooler of claim 8, wherein said holding devices are suitable for supporting said at least one molding in a region which is at a distance from the lowest point of said at least one molding which corresponds 60 to 75%, of said at least one molding width.

10. The food cooler of claim 8, wherein said holding devices are suitable for supporting said at least one molding in a region which is at a distance from the lowest point of said at least one molding which corresponds 60 to 75%, of said at least one molding height.

11. The food cooler of claim 1, wherein said holding devices further comprise at least one holding rod.

12. The food cooler of claim 1, wherein said holding devices are gridlike.

13. The food cooler of claim 1, wherein said holding devices further comprise compartments for receiving said at least one molding.

14. The food cooler of claim 1, wherein a precooling stage for precooling said at least one molding is provided.

15. The food cooler of claim 14, wherein said precooling stage for precooling said at least one molding comprises a prefreezing stage.

16. A food cooler for the cooling of food bodies selected from the group consisting of essentially flat foods and barlike foods, produced as moldings, comprising: a refrigerating space, at least one conveyor belt for conveying at least one molding through said refrigerating space, wherein said at least one conveyor belt is assigned one or more holding devices for said at least one molding; wherein said holding devices are designed for the defined holding of said at least one molding on said at least one conveyor belt in an inclined to upright position of at least 45°, and wherein said holding devices are suitable for supporting said at least one molding in a region which is at a distance from the lowest point of said at least one molding which corresponds to 60 to 75% of said at least one molding width or molding height.

17. The food cooler of claim 16, wherein said holding devices further comprise at least one holding rod, wherein said at least one holding rod extends approximately parallel to said at least one conveyor belt.

18. The food cooler of claim 16, wherein said holding devices further comprise compartments for receiving food bodies.

19. The food cooler of claim 16, wherein a precooling stage for precooling said at least one molding is provided.

20. The food cooler of claim 19, wherein said precooling stage for precooling of said at least one molding comprises prefreezing.

21. A food cooler for the cooling of food bodies selected from the group consisting of essentially flat foods and barlike foods, produced as moldings, comprising: a refrigerating space comprising a refrigerating medium, at least one conveyor belt for conveying at least one molding through said refrigerating space, holding devices, a precooling stage for the precooling of said at least one molding; wherein said at least one conveyor belt is assigned to holding devices for said at least one molding, said holding devices are designed for the defined holding of said at least one molding on said at least one conveyor belt in an inclined to upright position of at least 45°, with said at least one molding directly accessible to said refrigerating medium when conveyed through said refrigerating space, and wherein said holding devices are arranged with a spacing from one another which corresponds to the thickness of said at least one molding to be cooled.

22. The food cooler of claim 21, wherein said precooling comprises prefreezing of said at least one molding.

23. The food cooler of claim 21, wherein said holding devices are suitable for supporting said at least one molding in a region which is at a distance from the lowest point of said at least one molding which corresponds to 50 to 100% of said at least one molding width.

24. The food cooler of claim 21, wherein said holding devices are suitable for supporting said at least one molding in a region which is at a distance from the lowest point of said at least one molding which corresponds to 50 to 100% of said at least one molding height.

25. The food cooler of claim 21, wherein said distance from the lowest point of said at least one molding which corresponds to 60 to 75% of said at least one molding width.

26. The food cooler of claim 21, wherein said distance from the lowest point of said at least one molding which corresponds to 60 to 75% of said at least one molding height.

27. The food cooler of claim 21, wherein said holding devices further comprise at least one holding rod.

28. The food cooler of claim 27, wherein said holding rod extends approximately parallel to said at least one conveyor belt.

29. The food cooler of any of claim 16 or 21, wherein said holding devices are gridlike.

30. The food cooler of claim 21, wherein said holding devices further comprise compartments for receiving said at least one molding.

31. The food cooler of claim 1, wherein said cooling of said food bodies comprises deep freezing.

32. The food cooler of claim 16, wherein said cooling of said food bodies comprises deep freezing.

33. The food cooler of claim 21, wherein said cooling of said food bodies comprises deep freezing.

\* \* \* \* \*